United States Patent Office 3,845,226
Patented Oct. 29, 1974

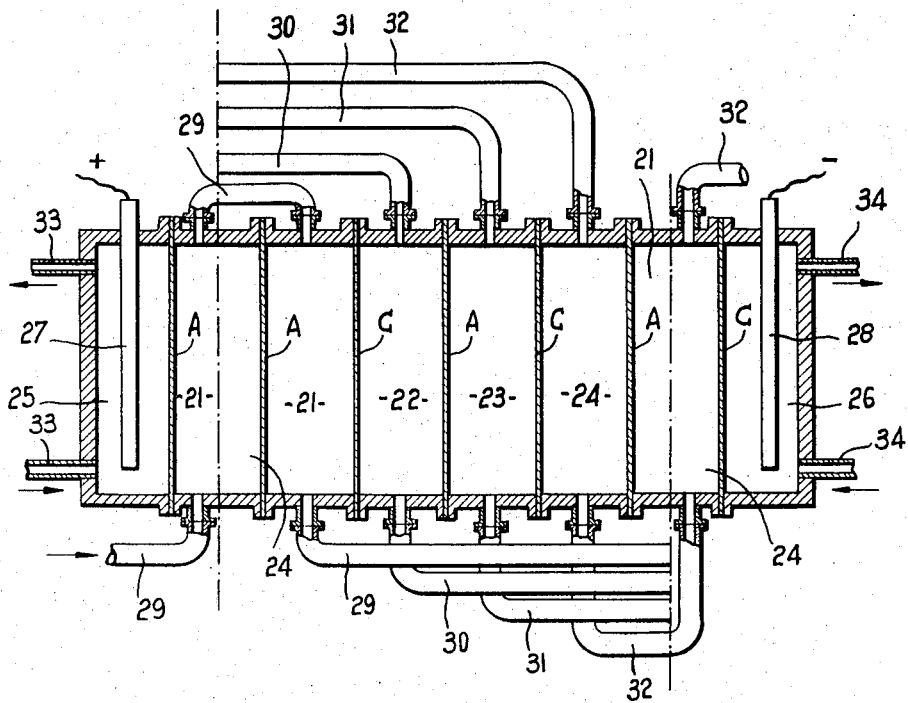

3,845,226
PREPARATION OF CURD FROM MILK
Marie Pierre Goujard, Neuilly-sur-Seine, France, assignor to CH. Gervais, Societe Anonyme, Paris, France
Continuation of abandoned application Ser. No. 619,272, Feb. 28, 1967. This application Nov. 3, 1970, Ser. No. 86,616
Claims priority, application France, Mar. 16, 1966, 53,707; May 25, 1966, 62,912
Int. Cl. A23c *19/02*
U.S. Cl. 426—239                    9 Claims

ABSTRACT OF THE DISCLOSURE

Curd is produced from milk by mixing milk at ambient temperature with whey that has been acidified to a pH of 0.5 to 2.5 by electrodialysis in an amount sufficient to bring the pH of the resulting mixture to a value lower than the isoelectric point of casein.

---

Figure 1:
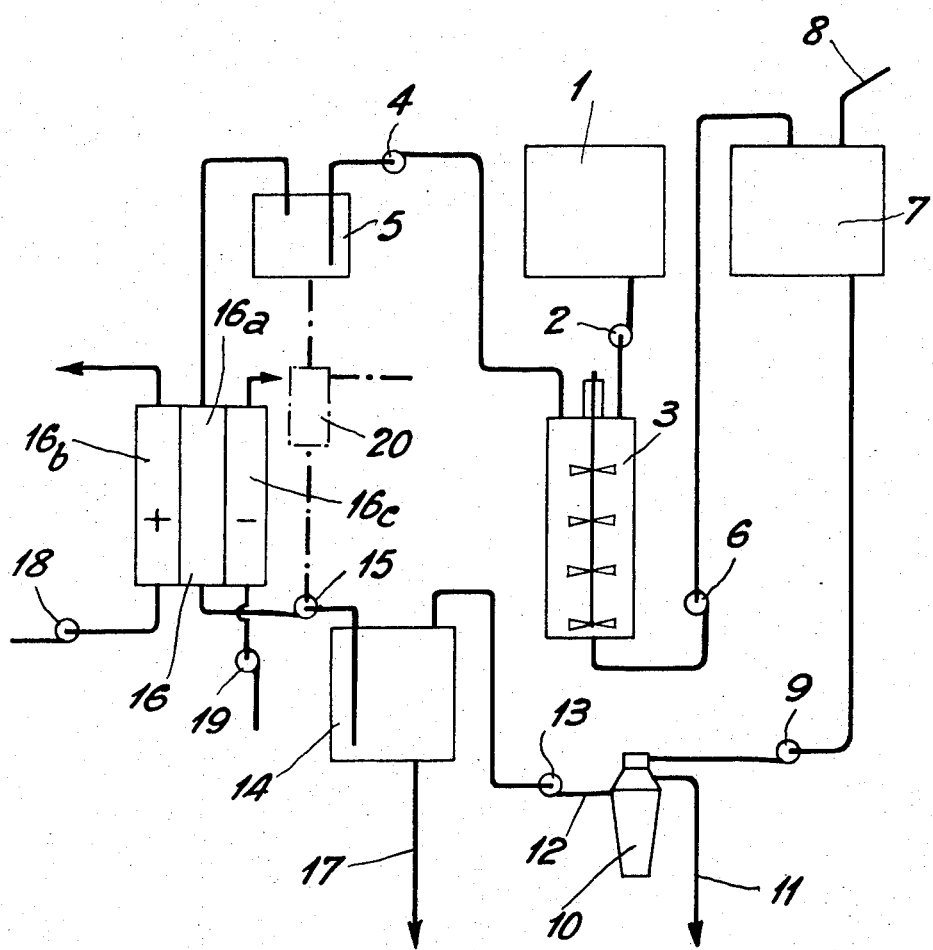

This application is a continuation of application Ser. No. 619,272, filed Feb. 28, 1967, now abandoned.

It is known that at present, generally speaking, curds in the cheese trade are made by composite processes utilising the action of rennet ad that of lactic ferments. Such processes are not readily adaptable to continuous operation and they are nothing more than the development on a large scale of an ancient and empirical technique.

With the object of attempting to mechanise the technical process of manufacturing cheeses it has already been proposed (M. E. Choubine—Dokl. nauchn. Monf. Vopr. Teckhn. Mikrobiol. Mol. molat. Prod, Vologda—1964 pp. 23 to 28) to pre-acidify milk by a lactic fermentation and then to collect a serum which one continues to acidify by fermentation.

The serum acidified in this way is then used to treat milk which has been previously and moderately acidified by fermentation, so as to bring the acidity of the mixture to the value sufficient to obtain coagulation of the curd. This coagulation furnishes, after separation of the curd, a serum which can be fermented in its turn, like the initial serum, in order to acidify it and which may be used for continuing the operation.

This process has numerous disadvantages among which may be mentioned its slow character; several hours are necessary in order to obtain the coagulation and at least one day in order to acidify the serum. In addition the process is uncertain, owing to the fact that the acidification results from a biological process. In effect the ferment stocks do not operate in a perfectly constant manner and the final acidity of the serum cannot be readily fixed at a determined value.

In addition the ferment stocks permitting the acidification of the serum rapidly become exhausted and, at any rate, the degree of acidification is limited, the concentration in active cells of the ferments decreasing in proportion to the progress of the said acidification.

The process moreover has the inconvenience of necessitating a heating in order to obtain the best yield which in spite of everything remains mediocre.

It should be mentioned finally that one of the main characteristics of the abovementioned process is a too extensive transformation of the lactose into lactic acid which confers the desired acidity on the serum; this strong degradation of the lactose is prejudicial to the quality of the product obtained.

The present invention has for its object a process for the manufacture of milk curd which is capable of being performed continuously and which also uses a mixture of milk with an acidified serum, but which permits rapid operation, enables well-defined conditions to be reproduced easily, and above all results in an excellent yield of a product of very good quality.

According to the invention a process for manufacturing milk curd by mixing milk with an acidified serum derived from a previous curdling operation, is characterised in that the acidification of the serum is performed by means which do not cause degradation of the lactose.

Such means may be chemical, and include the addition to the serum of a suitable mineral or organic acid.

The means may also be physico-chemical, the acidification of the serum then being obtained by electrodialysis.

Advantageously the acidification of the serum is continued until the pH of the serum falls to a value of about 0.5 to 2.5, and preferably from 0.9 to 2, these conditions being variable according to the nature of the acidification used.

The serum is then mixed with the milk so as to bring the pH of the mixture to a value between about 3 and 5. It has been observed in fact that at a pH above 5.2 no curdling no longer takes place, and that for at pH values lower than 2.8 the curdling results in very fine particles which are difficult to separate from the serum.

The figures which have just been indicated correspond to an addition to the milk of about 60 to 20% of serum by volume.

The operation is best performed at ambient temperature.

When the acidification is performed by chemical means, mineral acids may be employed, preferably acids such as hydrochloric acid and orthophosphoric acid, with which there is no risk of harming the quality of the product. However, other acids may be employed provided that suitable precautions are taken.

Among the organic acids, there may be used acetic acid, citric acid and, preferably, lactic acid, the choice of these acids being determined by their dissociation constants, their organoleptic character and especially their non-toxic character.

So far as the carrying out of the process by electrodialysis is concerned, it may be carried out in any device of known type which directs the electrodialysis towards an acidification of the serum.

Preferably, the initial serum is prepared by an acidifying electrodialysis of milk and separation of the curd obtained. Later, the process may be carried out continuously by acidifying a part of the serum collected after separation of the curd and mixing it with fresh milk.

When the process according to the invention is carried out by electrodialysis, it is preferable to use selective anionic and cationic membranes and to dispose these membranes judiciously so as to achieve acidification of the serum without impoverishment of cations.

According to a particularly advantageous embodiment of the invention, the serum to be acidified is placed between two selective membranes of opposite signs disposed so as to retain the ions in the serum, the acidification resulting from the combination of hydrogen ions and the anions yielded by the solutions adjacent to the membranes. The solution generating the hydrogen ions is an acid solution, preferably a strong acid.

As the source of anions, preferably there is used a solution of the same nature as the serum to be acid:fied, with the object of not introducing foreign substances.

This solution is advantageously constituted by a milk product, preferably surplus serum derived from a previous curdling operation.

The invention will now be described in greater detail, by way of example, with reference to the accompanying drawings, in which FIG. 1 is a flow diagram of apparatus for carrying out the process according to the invention, and FIG. 2 is a partial schematic view, partly in section, of an apparatus for carrying out the process according to the invention, which apparatus comprises selective membranes.

In the embodiment shown in FIG. 1, the milk which may be whole milk or skimmed milk and in which lactic ferments may also have been incorporated, for example by direct introduction of the latter or by addition of a milk product such as cream, so as to confer on the curd the organoleptic properties peculiar to these ferments, is delivered, from a reservoir 1 by means of a pump 2, into a mixer 3 into which is also introduced, by means of a pump 4, acidified serum coming from a reservoir 5.

The mixture of milk and serum is delivered, by a pump 6, into a vat 7 at which may terminate a pipe 8 enabling, if necessary, the incorporation into the mixture of ferments such as mentioned above, if such ferments are desired and if they have not been incorporated initially in the milk.

From the vat 7, the mixture is delivered by a pump 9 to a centrifugal separator 10 where the curd is collected at 11.

The serum leaves the separator via a pipe 12, and it is taken up by a pump 13 which delivers it into an intermediate reservoir 14.

A part of the serum in the reservoir 14 is delivered by a pump 15 into an electrodialyser 16 and the remainder is evacuated via a pipe 17.

The electrodialyser 16 has been shown very schematically, by way of example, as comprising a central portion 16a through which the serum passes and lateral anodic and cathodic compartments 16b and 16c, respectively. Obviously more sophisticated apparatus may be used of any appropriate type.

The anodic compartment is fed by means of a pump 18 and the cathodic compartment by means of a pump 19. The feed takes place by means of water or solutions of suitable electrolytes.

From the electrodialyser, the serum, suitably acidified, is delivered into the reservoir 5 for use in initiating the process, as has been described.

If the operation is not carried out by electrodialysis but by chemical acidification of the serum, the essential items of the apparatus described above are retained; it suffices to interpose between the pump 15 and the reservoir 5 a mixer 20 (shown in dotted lines) in place of the electrodialyser, which mixer serves to add the desired quantity of acid to the recycled serum.

It will thus be seen that the process according to the invention lends itself to continuous operation without the hazards associated with curdling by means of rennet or by fermentation.

The acidities both of the serum as well as of the serum-milk mixture may be easily controlled and reproduced.

The weak pH value of the acidified serum ensures that the latter is not subject to any fermentative process.

As regards the curd, it is produced with a very fine, non-granular structure and it possesses better keeping qualities than those of curds obtained by the known processes.

In addition, and this is very important, the curd is obtained in yields hitherto unknown in the cheese-making industry and which may be 50% better than those of the known processes.

This may be explained by the fact that the serum, according to the process of the invention, is strongly retained by the molecular products formed at the time of curdling.

It is thus possible to obtain yields of curd of about 350 to 600 g. per litre of milk treated wtih more than 100 g. of dry substance. These yields depend, to a certain extent, on the conditions of the centrifuging. Accelerations of from 250 to 1000 g. and centrifuging times of from 1 to 10 minutes give excellent results. The quality of the products obtained is also better than that given by the known processes.

Another advantage of the process is that it decreases the quantities of serum to be evacuated composed with the known processes.

The invention will now be further described in the ensuing, non-limitative Examples:

EXAMPLE 1

Curdling of milk by a serum acidified by acid electrodialysis.

1 litre of a serum derived from a milk curdling operation carried out as described below, and possessing the following characteristics:

| | | |
|---|---|---|
| Dry extract | percent | 5.7 |
| Fatty materials (with respect to the dry extract) | percent | 0.5 |
| pH | | 4.2 |
| Acidity, Dornic (D) | | 38° |
| Lactose content | g./l | 50 | is acidified by electrodialysis in order to give a serum having the following new characteristics:

| | | |
|---|---|---|
| Dry extract | percent | 5.4 |
| Fatty materials (with respect to the dry extract) | percent | 0.5 |
| pH | | 1.7 |
| Acidity | D | 83° |
| Lactose content | g./l | 49 |

1 litre of whole milk is added to this serum, in small fractions of equal volume, with stirring, this milk having the following principal characteristics:

| | | |
|---|---|---|
| Dry extract | percent | 13.2 |
| Fatty materials (with respect to the dry extract) | percent | 30.3 |
| pH | | 6.5 |
| Acidity | D | 14.5° |
| Lactose content | g./l | 48.5 |

The resulting mixture then has a pH of 4.05 and an acidity of 39° D.

This mixture is centrifuged at an acceleration of 750 g. for 3 minutes, and is separated into a curd and a new serum.

There is obtained 454 g. of curd possessing the following characteristics:

| | | |
|---|---|---|
| Dry extract | percent | 19.7 |
| Fatty materials (with respect to the dry extract) | percent | 43 |
| Lactose content (with respect to the dry extract) | percent | 24 |

In addition there is recovered 1.560 litres of a new serum having the following characteristics:

| | | |
|---|---|---|
| Dry extract | percent | 5.4 |
| Fatty materials (with respect to the dry extract) | percent | 0.5 |
| pH | | 4.05 |
| Acidity | °/D | 39 |
| Lactose content | g./l | 50 | which characteristics are very near to those of the initial serum.

EXAMPLE 2

The curdling of milk by a serum acidified with hydrochloric acid.

1 litre of serum, derived from a milk curdling operation carried out as described below and possessing the following characteristics:

| | | |
|---|---|---|
| Dry extract | percent | 7.3 |
| Fatty materials | percent | 0 |
| pH | | 4 |
| Acidity | °/D | 44 |
| Lactose content | g./l | 50.5 | is acidified by the addition of 6 ml. of concentrated hydrochloric acid.

The characteristics of the serum thus obtained are as follows:

| | |
|---|---|
| Dry extract _____ percent__ | 7.5 |
| Fatty materials _____ percent__ | 0 |
| pH _____ | 1.70 |
| Acidity _____ °/D__ | 105 |
| Lactose content _____ g./l__ | 50 |

This serum is added to 1 litre of whole milk, in small fractions of equal volume, with stirring.

The principal characteristics of the milk are:

| | |
|---|---|
| Dry extract _____ percent__ | 12.4 |
| Fatty materials (with respect to the dry extract) _____ percent__ | 33 |
| pH _____ | 6.65 |
| Acidity _____ °/D__ | 15.5 |
| Lactose content _____ g./l__ | 49 |

The pH of the resulting mixture is equal to 3.90 and the acidity is 61° D.

After centrifuging this mixture for 3 minutes with an acceleration of 750 g., there is collected:

(a) 540 g. of curd having the following characteristics:

| | |
|---|---|
| Dry extract _____ percent__ | 18.3 |
| Fatty materials (with respect to the dry extract) _____ percent__ | 40.5 |
| Lactose content (with respect to the dry extract) _____ percent__ | 25 |

(b) 1.480 litres of a serum having the following characteristics:

| | |
|---|---|
| Dry extract _____ percent__ | 7.15 |
| Fatty materials _____ percent__ | 0 |
| pH _____ | 3.90 |
| Acidity _____ °/D__ | 50.5 |
| Lactose content _____ g./l__ | 50 |

EXAMPLE 3

The curdling of milk by a serum acidified with lactic acid.

1 litre of a serum, derived from a milk curdling operation carried out as described below, and possessing the following characteristics:

| | |
|---|---|
| Dry extract _____ percent__ | 7.1 |
| Fatty materials (with respect to the dry extract) _____ percent__ | 0.6 |
| pH _____ | 4.50 |
| Acidity _____ °/D__ | 40.5 |
| Lactose content _____ g./l__ | 49.5 | is acidified by the addition of 7 ml. of lactic acid (of a specific gravity 1.21).

This acidified serum has the following characteristics:

| | |
|---|---|
| Dry extract _____ percent__ | 7.7 |
| Fatty materials (with respect to the dry extract) _____ percent__ | 0.6 |
| pH _____ | 3.50 |
| Acidity _____ °/D__ | 102 |
| Lactose content _____ g./l__ | 49 |

This serum is added to 1 litre of whole milk in small fractions of equal volume, with stirring.

The principal characteristics of the milk are:

| | |
|---|---|
| Dry extract _____ percent__ | 12.4 |
| Fatty materials (with respect to the dry extract) _____ percent__ | 33 |
| pH _____ | 6.65 |
| Acidity _____ °/D__ | 15.5 |
| Lactose content _____ g./l__ | 49 |

The resulting mixture has a pH of 4.45 and an acidity of 59.5° D.

After centrifuging the mixture for 3 minutes at an acceleration of 750° g., there is obtained:

(a) 488 g. of a curd having the following characteristics:

| | |
|---|---|
| Dry extract _____ percent__ | 18.75 |
| Fatty materials (with respect to the dry extract) _____ percent__ | 43.5 |
| Lactose content (with respect to the dry extract) _____ percent__ | 24 |

(b) 1.520 litres of a serum having the following characteristics:

| | |
|---|---|
| Dry extract _____ percent__ | 7.7 |
| Fatty materials (with respect to the dry extract) _____ percent__ | 1 |
| pH _____ | 4.05 |
| Acidity _____ °/D__ | 49.5 |
| Lactose content _____ g./l__ | 49.5 |

In the example shown in FIG. 2, the electrodialysis apparatus is formed by a series of elementary cells with four compartments defined by alternate anionic and cationic membranes A, C, and by two end anodic and cathodic compartments 25, 26 containing, respectively, an anode 27 and a cathode 28. Each of the cells includes a compartment 21 through which an acid solution circulates, for example, hydrochloric or sulphuric acid at concentrations of the order of 0.05N to 0.2N, a compartment 22 through which the serum to be acidified circulates, a compartment 23 containing the serum donating the anions and a water compartment 24 for the removal of the secondary ionic species. The compartments 21 are served by pipes 29, the compartments 22 by pipes 30, the compartments 23 by pipes 31 and the compartments 24 by pipes 32.

In the end compartments water may be circulated at suitable flow rates by means of pipes 33, 34.

In use, the cationic membrane separating the serum from the acid solution prevents anions from leaving the serum but allows the passage of protons coming from the acid compartment; the anionic membrane separating the serum to be acidified from the serum donating the anions retains the cations in the first, but allows passage of anions from the donor serum towards the treated serum. There is thus produced a progressive acidification of the serum resulting in an increase in anions and in protons and not in an ionic substitution.

By suitably controlling the different variable factors of the electrodialysis, and in particular by controlling the nature, the concentration and the renewal of the liquids feeding the compartments other than those which contain the serum to be acidified—namely the anodic solution, the acid solution, the second serum, the aqueous solution evacuating the salts formed, and the cathodic solution—the acidification of the serum can be carried out under good conditions.

This acidification is continued up to a pH value of from 0.5 to 3, preferably in the region of 1.85.

The acidified serum is mixed milk in suitable proportions in the manner previously described; the centrifuging of this mixture permits the separation of a curd and a serum of which a part is returned to the electrodialyser.

The following non-limitative Example illustrates the invention:

EXAMPLE 4

1 litre of serum derived from a milk curdling operation carried out as described below and possessing the following characteristics:

| | |
|---|---|
| Dry extract _____ percent__ | 6.4 |
| Fatty materials _____ percent__ | 0 |
| pH _____ | 4.40 |
| Acidity _____ D__ | 39.5° |
| Calcium content _____ g./l__ | 0.96 |
| Lactose content _____ g./l__ | 51.5 | is acidified by electrodialysis as described above, to give a serum having the following new characteristics:

| | | |
|---|---|---|
| Dry extract | percent | 6.7 |
| Fatty materials | percent | 0 |
| pH | | 1.90 |
| Acidity | D | 125° |
| Calcium content | g./l | 0.96 |
| Lactose content | g./l | 51.5 |

This serum is added, in small fractions of equal volume, while stirring, to 1 litre of whole milk having the following characteristics:

| | | |
|---|---|---|
| Dry extract | percent | 13.4 |
| Fatty materials (with respect to the dry extract) | percent | 27.4 |
| pH | | 6.75 |
| Acidity | D | 15.7° |
| Calcium content | g./l | 1.30 |
| Lactose content | g./l | 52 |

The resulting mixture then has a pH of 4.15 and an acidity of 55° D. By centrifuging this mixture, at an acceleration of 750 g. for 3 minutes, there is separated a curd and a new serum. There is obtained 480 g. of curd possessing the following characteristics:

| | | |
|---|---|---|
| Dry extract | percent | 19.8 |
| Fatty materials (with respect to the dry extract) | percent | 38 |
| Calcium content (with respect to the dry extract) | percent | 0.54 |
| Lactose content (with respect to the dry extract) | percent | 25 |

In addition, there is recovered 1.530 litres of a new serum having the following characteristics:

| | | |
|---|---|---|
| Dry extract | percent | 6.4 |
| Fatty materials | percent | 0 |
| pH | | 4.10 |
| Acidity | D | 55° |
| Calcium content | g./l | 1.14 |
| Lactose content | g./l | 51.5 |

What is claimed is:

1. A method for manufacturing milk curd comprising acidifying whey in a manner which does not cause degradation of lactose until the pH value of said whey is between 0.5 and 2.5 by subjecting said whey to an acidifying electrodialysis, mixing said acidified whey with milk at ambient temperature in a proportion sufficient to bring the acidity of the mixture to a pH value lower than that which corresponds to the isoelectric point of the casein and separating the curd obtained from the remaining liquid.

2. A process according to Claim 1, in which the acidifying electrodialysis process is carried out with circulation of electrolytes through the electrodialysis device.

3. A process according to Claim 1, in which selective anionic and cationic membranes are used, said whey to be acidified being placed between two membranes of opposite signs disposed so as to retain the ions in said whey, the acidification resulting from the combination of hydrogen ions and anions yielded by the solutions adjacent to the respective membranes.

4. A process according to Claim 3, in which the hydrogen ions are yielded by a solution of a strong acid.

5. A process according to Claim 4, in which the anions are yielded by a solution of the same nature as said whey to be acidified.

6. A process according to Claim 5, in which the solution of the same nature as said whey is constituted by a milk product.

7. A process according to Claim 6, in which the milk product is whey derived from a previous curdling operation.

8. A process according to Claim 1, in which the acidification of said whey is continued until its pH value is from 0.9 to 2.

9. A process according to Claim 1, in which said acidified whey is mixed with the milk so as to bring the pH value of the mixture to between 3 and 5.

References Cited
UNITED STATES PATENTS

| | | | |
|---|---|---|---|
| 3,423,208 | 1/1969 | Kuipers | 99—20 |
| 3,484,356 | 12/1969 | Goujard | 99—57 X |
| 2,963,370 | 12/1960 | Roundy | 99—116 |
| 3,369,906 | 2/1968 | Chen | 99—57 X |
| 3,320,072 | 5/1967 | Clark et al. | 99—57 X |

DAVID M. NAFF, Primary Examiner

U.S. Cl. X.R.

426—36, 361